(12) United States Patent
Rapowitz et al.

(10) Patent No.: US 12,019,732 B2
(45) Date of Patent: Jun. 25, 2024

(54) USER PRESENCE DETECTION FOR AUTHENTICATION QUESTION GENERATION

(71) Applicant: Capital One Services, LLC, McLean, VA (US)

(72) Inventors: Samuel Rapowitz, Roswell, GA (US); Tyler Maiman, Melville, NY (US); Joshua Edwards, Philadelphia, PA (US); Viraj Chaudhary, Katy, TX (US); Daniel Miller, Astoria, NY (US); David Septimus, New York, NY (US); Jenny Melendez, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 380 days.

(21) Appl. No.: 17/368,035

(22) Filed: Jul. 6, 2021

(65) Prior Publication Data
US 2023/0009527 A1 Jan. 12, 2023

(51) Int. Cl.
*G06F 21/45* (2013.01)
*H04L 9/40* (2022.01)

(52) U.S. Cl.
CPC .......... *G06F 21/45* (2013.01); *H04L 63/102* (2013.01); *G06F 2221/2103* (2013.01); *G06F 2221/2111* (2013.01)

(58) Field of Classification Search
CPC ............ G06F 21/45; G06F 2221/2103; G06F 2221/2111; H04L 63/102
See application file for complete search history.

(56) References Cited

U.S. PATENT DOCUMENTS

| | | | |
|---|---|---|---|
| 8,646,060 B1 * | 2/2014 | Ben Ayed | H04W 4/20 726/9 |
| 9,152,775 B1 * | 10/2015 | Kronrod | G06F 21/31 |
| 9,485,237 B1 * | 11/2016 | Johansson | H04L 9/3271 |
| 9,916,608 B1 * | 3/2018 | Ramalingam | G06Q 20/10 |
| 10,147,102 B2 * | 12/2018 | Zamer | G06Q 50/01 |
| 10,482,441 B1 * | 11/2019 | Watson | G06Q 20/202 |
| 2008/0005037 A1 | 1/2008 | Hammad et al. | |
| 2011/0238517 A1 * | 9/2011 | Ramalingam | H04W 4/021 705/16 |
| 2013/0160098 A1 * | 6/2013 | Carlson | G06F 21/31 726/6 |

(Continued)

*Primary Examiner* — Hee K Song
(74) *Attorney, Agent, or Firm* — Banner & Witcoff, Ltd.

(57) ABSTRACT

Methods, systems, and apparatuses are described herein for improving computer authentication processes by generating authentication questions based on the location of a user. Transaction data indicating a plurality of transactions associated with a user account may be received. Location data indicating a plurality of locations of a user device might be received. At least a subset of the plurality of transactions may be tagged, based on the location data, with an indication that a user was present for a respective transaction. For example, a location of a merchant might be compared to a user device location indicated by the location data. A plurality of authentication questions might be generated based on the subset of the plurality of transactions. Access to the user account might be provided based on responses to the plurality of authentication questions.

20 Claims, 6 Drawing Sheets

(56) References Cited

U.S. PATENT DOCUMENTS

| | | | |
|---|---|---|---|
| 2015/0161375 A1* | 6/2015 | Ghosh | G06F 21/36 |
| | | | 726/7 |
| 2017/0053280 A1* | 2/2017 | Lishok | G06Q 20/3224 |
| 2017/0091765 A1* | 3/2017 | Lloyd | G06Q 20/321 |
| 2018/0285877 A1 | 10/2018 | Bracconeri et al. | |
| 2019/0114643 A1* | 4/2019 | Dewitt | G06Q 20/3226 |
| 2020/0065459 A1* | 2/2020 | Himabindu | G06F 21/316 |
| 2020/0382327 A1* | 12/2020 | Mokhasi | G06Q 20/4097 |
| 2023/0009527 A1* | 1/2023 | Rapowitz | H04L 63/102 |

\* cited by examiner

When did you conduct an in-person transaction at Merchant A?

| Around 9:00 AM | Around 9:30 AM |

First Authentication Question
(601)

Did you purchase anything at Merchant B at 9:00 AM?

| Yes | No |

Second Authentication Question
(602)

Did you purchase at Merchant A online or in person?

| Online | In Person |

Third Authentication Question
(603)

Who shopped at Merchant A this morning?

| User A | User B |

Fourth Authentication Question
(604)

FIG. 6

USER PRESENCE DETECTION FOR AUTHENTICATION QUESTION GENERATION

FIELD OF USE

Aspects of the disclosure relate generally to account security. More specifically, aspects of the disclosure may provide for improvements in the method in which authentication questions are generated by using user device location data to generate authentication questions based on previous transactions.

BACKGROUND

As part of determining whether to grant a user access to content (e.g., as part of determining whether to provide a caller access to a telephone system that provides banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth location, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like. In some instances, the user might be asked about transactions that they did not conduct. For example, a computing device might generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user might be able to glean personal information about the legitimate user.

Because multiple users might have access to a financial account, it is possible that authentication questions based on transaction data might not be memorable to a legitimate user because the legitimate user did not conduct the transaction. For example, if a checking account is shared by two spouses, then one spouse might not recall (or even know about) all purchases made by the other spouse, especially if such purchases are minor or otherwise non-memorable. As a result, authentication questions might inadvertently confuse a legitimate user by asking a legitimate user about genuine transactions, albeit ones they did not conduct. This can, in practice, prevent a legitimate user from gaining access to their own account.

Aspects described herein may address these and other problems, and generally improve the safety of financial accounts and computer transaction systems by using location data when generating authentication questions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are generated and presented. By analyzing location data indicating a location of a user device over time, the location of a user might be determined. In this manner, when that user conducts a transaction, it might be determined whether a particular user (e.g., one of a plurality of different authorized users for an account) was physically present for a transaction, and transactions where a user was physically present might be tagged as such. In this manner, a user's in-person transactions may be distinguished from their online transactions (as well as transactions conducted by a different user using the same financial account). Using those tagged transactions, authentication questions might be generated in a manner which reflects the knowledge that a user was physically present during a transaction. For example, a user might be asked authentication questions only for transactions where they were physically present. As another example, a user might be asked to identify whether they conducted a particular transaction online or in a physical retail store.

More particularly, some aspects described herein may provide for a computing device that may receive transaction data associated with a user account. The transaction data may indicate a plurality of transactions associated with the user account. The computing device may receive, from a user device associated with the user account, location data indicating a plurality of locations of the user device at different times. The computing device may tag at least a subset of the plurality of the transactions with an indication that a user was present for a respective transaction. To perform this tagging, the computing device may determine a location of a merchant associated with the respective transaction, compare the location data to the location of the merchant at a time of the respective transaction, and, based on the comparing, tag the transaction with the indication that the user was present for the respective transaction. The computing device may generate, based on the subset of the plurality of transactions, a plurality of authentication questions. The computing device may provide access to the user account based on responses to the plurality of authentication questions.

According to some embodiments, the transaction data may comprise an indication, for each of the plurality of transactions, of whether a payment card was present during the transaction. In that circumstance, each of the subset of the plurality of transactions may be associated with an indication that the payment card was present during the transaction. The computing device may determine an accuracy of the location data. In that circumstance, determining whether the user was near the location of the merchant at the time of the respective transaction may be based on the accuracy of the location data. The computing device may determine a density of merchants near the location of the merchant. In that circumstance, determining whether the user was near the location of the merchant at the time of the respective transaction may be based on the density of merchants near the location of the merchant. The computing device may identify, from the plurality of transactions, a second subset of transactions where the user was not present, generate a second plurality of authentication questions based on the second subset of transactions, and calculate, based on the responses to the plurality of authentication questions and based on responses to the second plurality of authentication questions, an authentication score. The computing device may determine, based on the location data, whether the user was near the location of the merchant at a time of the respective transaction by performing steps such as determining that the location data does not indicate a location of the user device at the time of the respective transaction, determining that the location data indicates a location of the user device at a different time, and estimating, based on a difference between the time of the transaction and the different time and based on a distance between the location of the merchant and the location of the user device at the different time, whether the user was likely near the location of the merchant at the time of the respective transaction. The subset of the plurality of transactions may comprise at least one transaction made by an authorized user who is different from the user.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 depicts examples of authentication questions which might be generated based on transactions tagged based on whether a user was physically present for a particular transaction.

DETAILED DESCRIPTION

Figure 1:
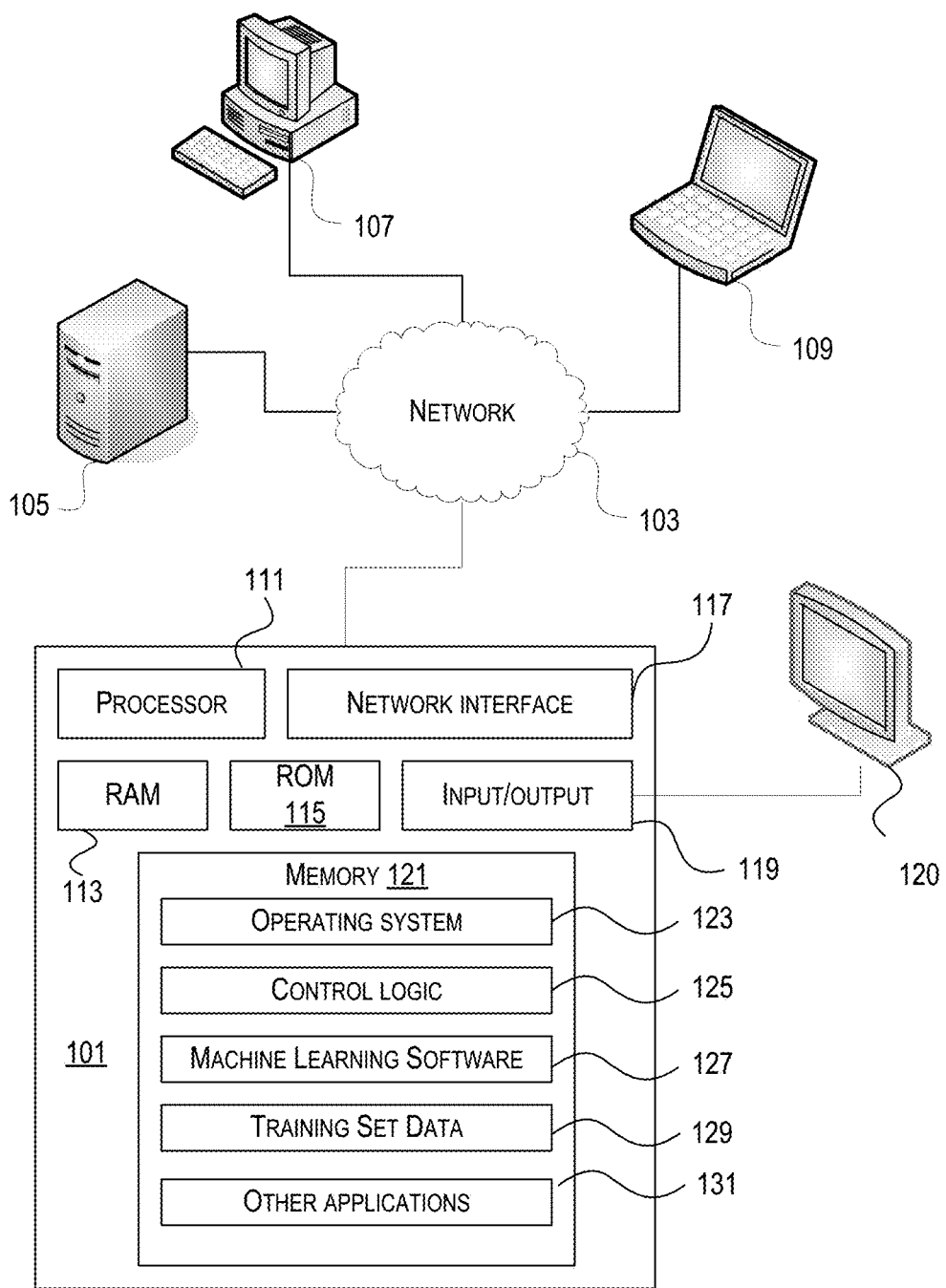
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the manner in which authentication questions are generated and used during an authentication process. In particular, the process depicted herein may use location information corresponding to a user device (e.g., a mobile computing device carried with a user, such as a smartphone) to tag transactions where a user is predicted to have been present. In this manner, authentication questions might be premised on the presence (and/or non-presence) of a user during a transaction.

As an example of one problem addressed by the current disclosure, an authentication system might, as part of an authentication process for accessing an account, generate a plurality of different authentication questions based on a transaction history for an account, then present those different authentication questions to a user as part of an authentication process. But because an account might be shared, the transaction history might reflect transaction activity by a variety of different authorized users. In that circumstance, one user might not be able to answer questions about all transactions associated with an account. This problem might be particularly exaggerated by online transactions: for example, one authorized user of an account might not know that another authorized user of the user account made a purchase online because, after all, the online transaction could have been made at virtually any time and without a particular physical transaction card in-hand. These issues might cause a legitimate user to be denied access to their account for reasons largely outside of their control.

Aspects described herein remedy this problem by, as will be explained in greater detail below, analyzing location data corresponding to a location of a user device (e.g., a user's smartphone, which they are likely to carry with them regularly) at different times to tag a transaction based on whether the user device (and, by inference, a user) was physically present during that transaction. Authentication questions might then be generated in view of this tagging such that, for example, an authentication question might be presented to a user only if they were physically present during the transaction, and/or a user might be asked to confirm whether they conducted a particular transaction in-person or online.

Aspects described herein improve the functioning of computers by improving the way in which computers provide authentication questions and protect computer-implemented accounts. The speed and processing complexity of computing devices allows them to present more complicated authentications than ever before, which advantageously can improve the security of sensitive account information. That said, the algorithms with which authentication questions are generated can be undesirably limiting, in effect inadvertently excluding legitimate users from accessing computing resources (e.g., accounts) to which they are entitled. Additionally, the proliferation of computing devices associated with a user can generate various data about a user. That data, often voluminous, can be contradictory and may require verification. For example, credit card transaction data may tend to indicate that a user was at a given location associated with a transaction, but user smartphone data may indicate that a user actually was not at the location during the transaction. Similarly, one type of user data may be incomplete, but may be supplemented (e.g., completed) by user data from another source. For example, if two authorized users are shopping or dining together, then both of the users may be present during a transaction, although transaction data may only indicate that one of the users (e.g., the one whose card was used for the transaction). Thus, the proliferation of user data creates problems that must be resolved by analyzing and synchronizing the user data before using the user data to make a decision. The processes described herein provide solutions to these issues and improve the state of the art by generating and presenting authentication questions in a manner which analyzes the location history of a computing device (e.g., a user's smartphone) with respect to transaction data to generate computer-implemented authentication questions which are easier for legitimate users to answer, while simultaneously still protecting valuable computing resources. Such steps cannot be performed by a user and/or via pen and paper at least because the problem is fundamentally rooted in computing processes, involves a significantly complex amount of data, including large amounts of user data that may be contradictory, and word processing, and requires steps (e.g., retrieving and analyzing the location of a user device, such as a smartphone) which cannot be performed by a human being. Moreover, the present process involves multiple computing devices, as the process described herein may relate to computer-implemented authentication processes which rely on the analysis of the location of one or more different computing devices.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
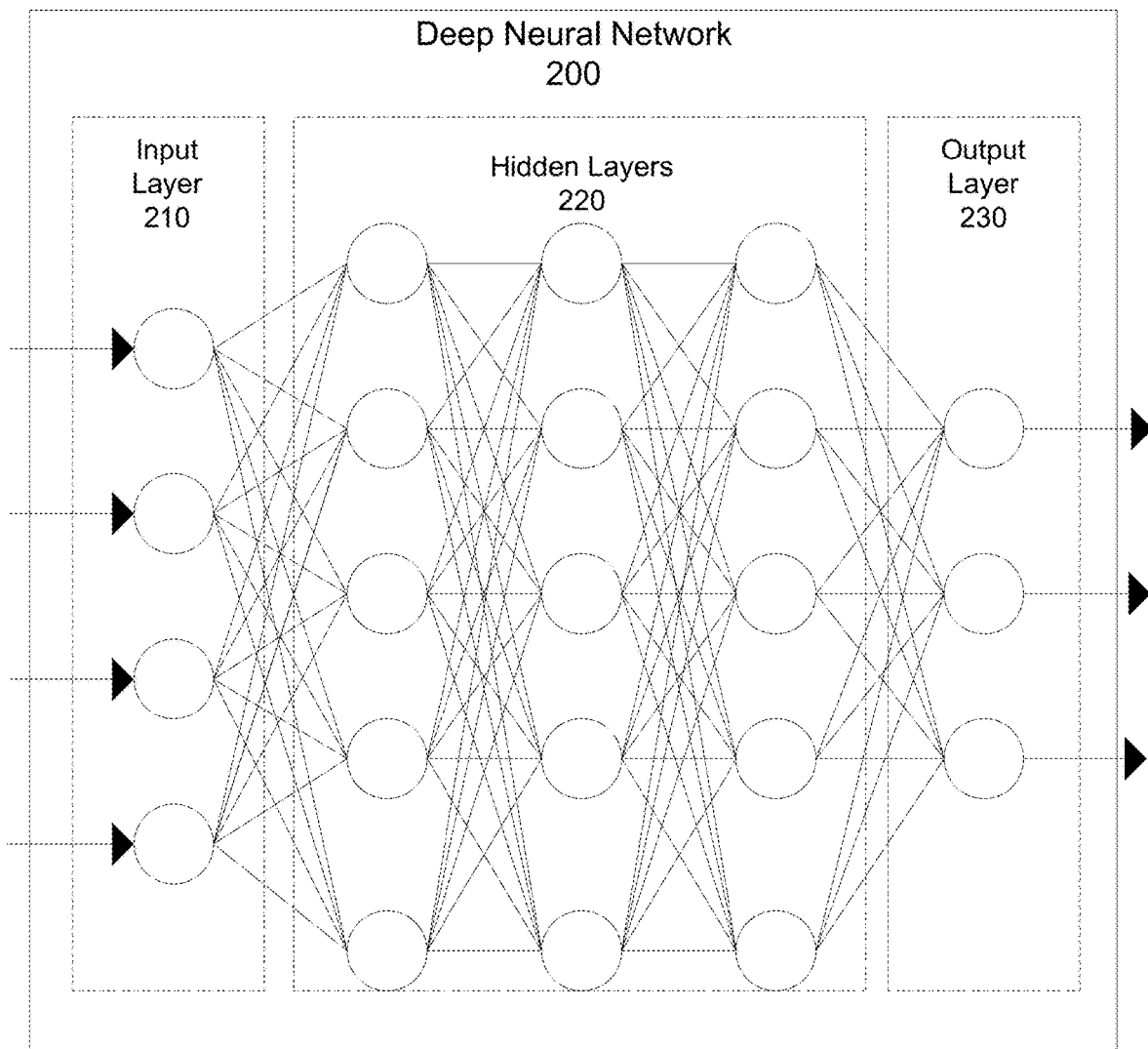
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
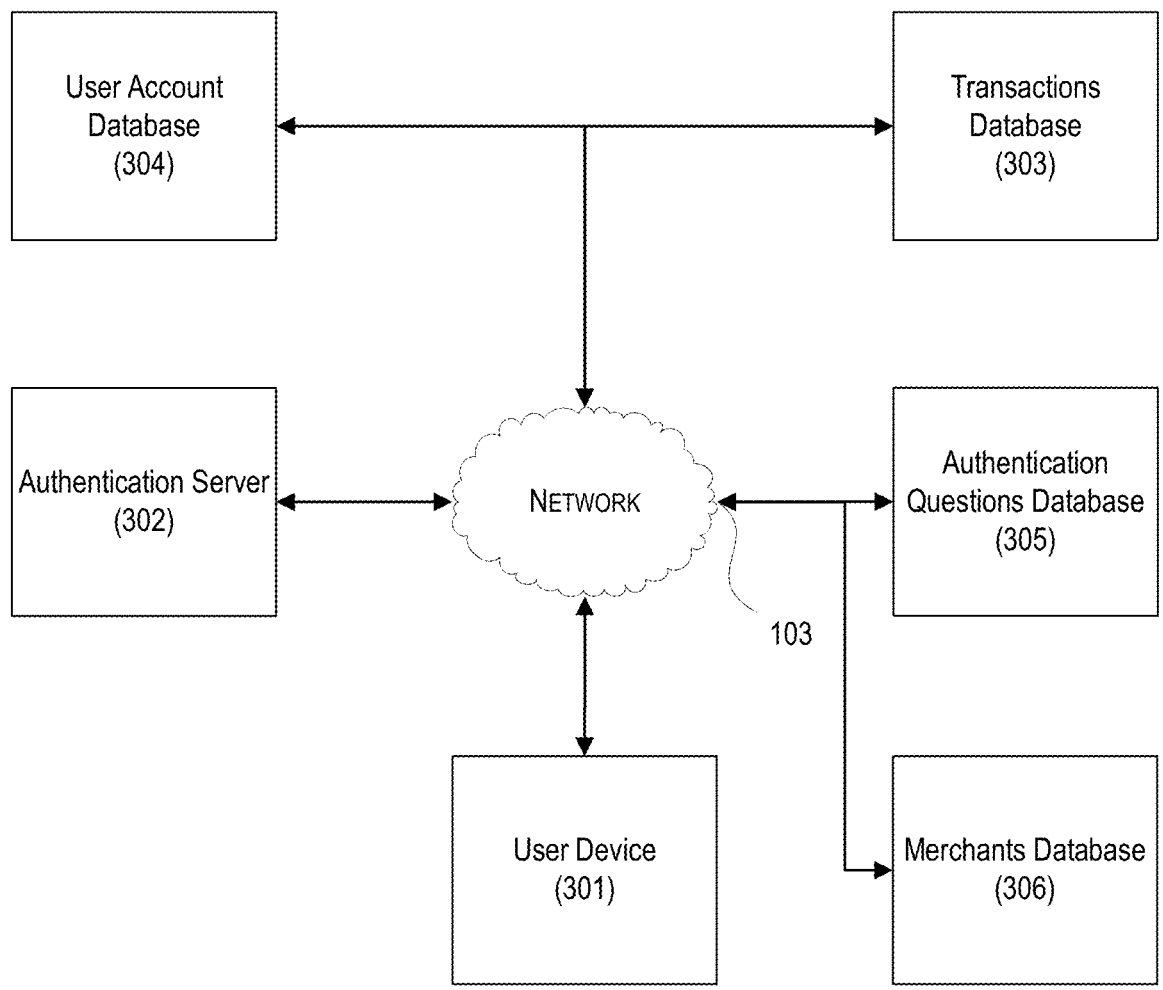
FIG. 3 depicts a system comprising different computing devices that may be used in implementing one or more aspects of the disclosure in accordance with one or more illustrative aspects discussed herein.

FIG. 3 depicts a system for authenticating access to an account. A user device 301 is shown as connected, via the network 103, to an authentication server 302, a transactions database 303, a user account database 304, an authentication questions database 305, and an merchants database 306. The network 103 may be the same or similar as the network 103 of FIG. 1. Each of the user device 301, the authentication server 302, the transactions database 303, the user account database 304, the authentication questions database 305, and/or the merchants database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

The user device 301 shown here might be a smartphone, laptop, or the like. The user device 301 might be capable of moving to different geographical locations. For example, a smartphone might be carried, by a user, throughout the course of their day. The user device 301 might be capable of collecting location data that indicates a plurality of locations of the user device 301 at different times. For example, the user device 301 might be configured to periodically store Global Position System (GPS) coordinates corresponding to its location. To collect such information, the user device 301 might be configured with GPS circuitry or similar circuitry which permits the user device 301 to determine its location. Additionally and/or alternatively, the user device 301 might be configured to determine and store its location based on nearby wireless access points. For example, the user device 301 might periodically store a list of nearby wireless access points identifiers. That list might comprise a signal strength of the various wireless access points. Those stored wireless access points might be compared to a database of known wireless access points to determine an approximate location of the user device. Using the stored signal strength, the approximate location of the user device 301 might be triangulated.

The location data collected and stored by the user device 301 might be private, such that a user of the user device 301 might be required to opt-in to sharing the location data with other computing devices (e.g., the authentication server 302). As such, any steps involving the location data might be conditioned on permission, by a user of the user device 301, to use the location data.

As part of an authentication process, a computing device (e.g., the user device 301 and/or another computing device) might communicate, via the network 103, to access the authentication server 302 to request access (e.g., to a user account). For example, a computing device might access a website associated with the authentication server 302, and the computing device might provide (e.g., over the Internet and by filling out an online form) candidate authentication credentials to that website. The authentication server 302 may then determine whether the authentication credentials are valid. For example, the authentication server 302 might compare the candidate authentication credentials received from the computing device with authentication credentials stored by the user account database 304. In the case where the communication is telephonic, the authentication server 302 might receive such credentials via, for example, a conventional telephone call.

The user account database 304 may store information about one or more user accounts, such as a username, password, demographic data about a user of the account, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as their age, gender, location, occupation, education level, income level, and/or the like.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account. As will be described further below, synthetic transactions might be based, in whole or in part, on legitimate transactions reflected in data stored by the transactions database 303. In this way, the synthetic transactions might better emulate real transactions.

The account data stored by the user account database 304 and the transactions database 303 may, but need not be related. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might be used for dynamic authentications questions, such as questions dynamically generated for a particular authentication session and/or generated based on information corresponding to a particular account. The authentication questions database 305 might comprise data for one or more templates which may be used to generate an authentication question based on real information (e.g., from the user account database 304 and/or the transactions database 303) and/or based on synthetic information (e.g., synthetic transactions which have been randomly generated and which do not reflect real transactions). The authentication questions database 305 might additionally and/or alternatively comprise historical authentication questions. For example, the authentication questions database 305 might comprise code that, when executed, randomly generates an authentication question, then stores that randomly-generated authentication question for use with other users.

An authentication question might correspond to a synthetic transaction (e.g., a transaction which never occurred). For example, a synthetic transaction indicating a $10 purchase at a coffee shop on Wednesday might be randomly generated, and the authentication question could be, e.g., "Where did you spent $10 last Wednesday?," "How much did you spend at the coffee shop last Wednesday?," or the like. In all such questions, the correct answer might indicate that the user never conducted the transaction. As part of generating authentication questions based on synthetic transactions, organizations might be randomly selected from a list of organizations stored by the merchants database 306. Additionally and/or alternatively, as part of generating such authentication questions based on synthetic transactions, real transactions (e.g., as stored in the transactions database 303) might be analyzed. In this manner, real transactions might be used to make synthetic transactions appear more realistic.

The authentication questions stored in the authentication questions database 305 may be associated with varying levels of difficulty. For example, straightforward answers that should be easily answered by a user (e.g., "What is your mother's maiden name?") might be considered easy questions, whereas complicated answers that require a user to remember past transactions (e.g., "How much did you spend on coffee yesterday?") might be considered difficult questions. An authentication process might prompt a user to answer multiple authentication questions. For example, a user might be required to correctly answer three easy authentication questions and/or to answer one hard authentication question.

The merchants database 306 might store data relating to one or more merchants, including indications (e.g., names) of merchants, aliases of the merchants, locations of the merchants, and the like. That data might be used to generate authentication questions that comprise both correct answers (e.g., based on data from the transactions database 303 indicating one or more merchants where a user has in fact conducted a transaction) and synthetic transactions (e.g., based on data from the merchants database 306, which might be randomly-selected merchants where a user has not conducted a transaction). For example, a computing device might, as part of randomly generating a synthetic transaction using instructions provided by the authentication questions database 305, generate a synthetic transaction by querying the merchants database 306 for a list of merchants, then removing, from that list, organizations represented in the data stored by the transactions database 303.

The merchants database 306 may additionally and/or alternatively comprise data indicating the location of one or more merchants. A location of a merchant might be a particular location (e.g., GPS coordinates), a region (e.g., a particular geographic area), or the like. Each merchant might be associated with a plurality of different locations. For example, one merchant might have multiple locations (e.g., a coffee chain might have multiple stores). As another example, another merchant might correspond to a large store with two different check-out areas, such that a transaction conducted at that merchant would be conducted at one of the different check-out areas.

Having discussed several examples of computing devices which may be used to implement some aspects as discussed further below, discussion will now turn to a method for analyzing location data and generating authentication questions.

Figure 4:
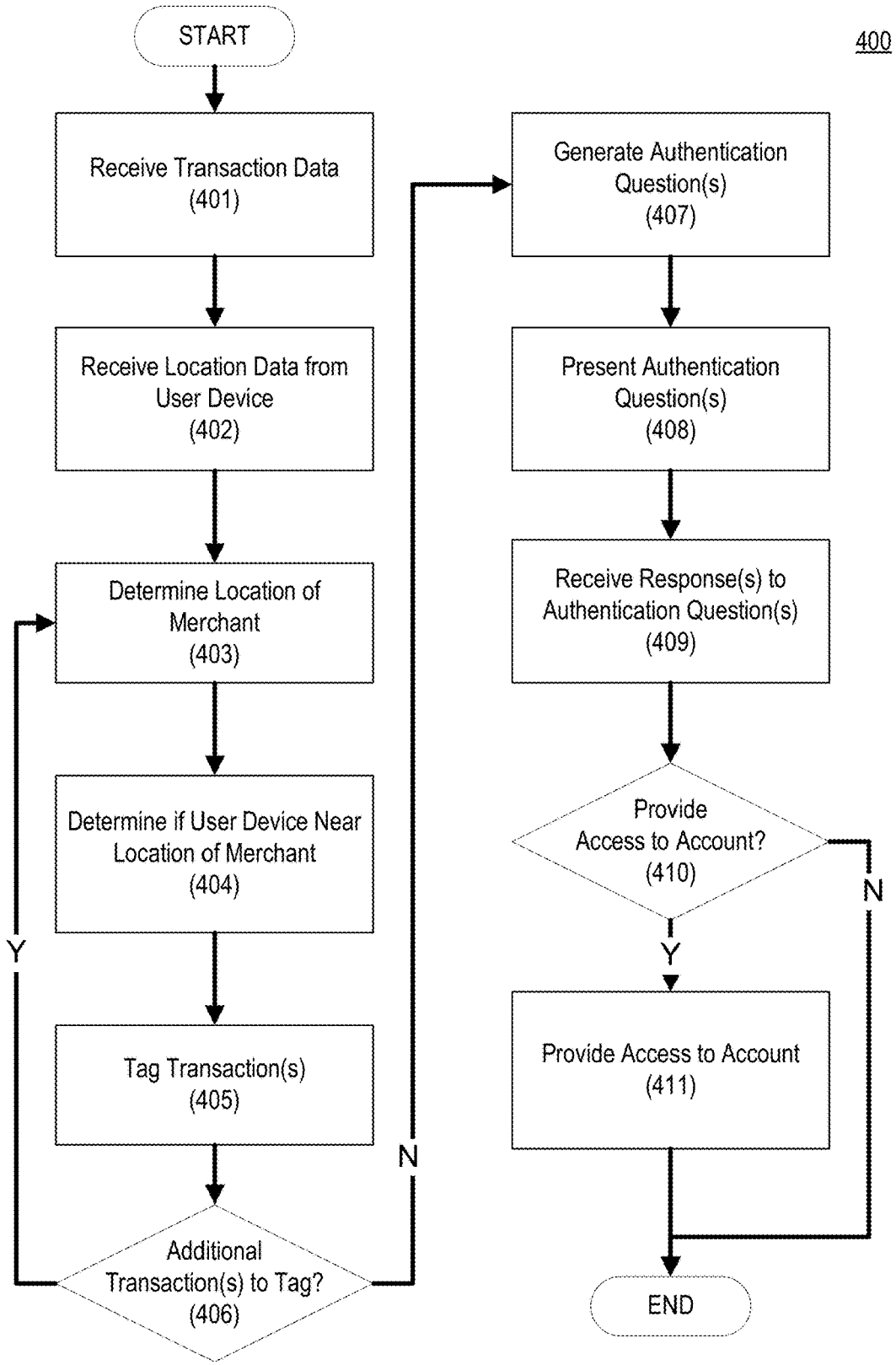
FIG. 4 depicts a flow chart comprising steps which may be performed for tagging transactions based on location data and generating authentication questions.

FIG. 4 illustrates an example method 400 for tagging transactions based on location data and generating authentication questions in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged, omitted, and/or otherwise modified as desired.

In step 401, the computing device may receive transaction data for a plurality of transactions associated with an account. The transaction data might correspond to a particular account. For example, the computing device may receive transaction data associated with a user account. The transaction data may be received from, e.g., the transactions database 303. The transactions data may indicate one or more transactions conducted by the user and/or may indicate a plurality of transactions associated with the account. For example, the transactions data may comprise indications of purchases of goods and/or services made by a user. The transactions data might correspond to a period of time, such as a recent period of time (e.g., the last two months, the last four months, or the like).

The transaction data may comprise an indication, for each of the plurality of transactions, of whether a payment card was present during the transaction. Transaction data generated as part of a transaction might indicate whether a payment card (e.g., a transaction card such as a credit card, debit card, or the like) was used to conduct that transaction. For example, a user might use a credit card to purchase a meal by inserting the credit card into a point of sale machine, and the point of sale machine might cause transaction data to be generated. In such a circumstance, the card might be said to be present. In contrast, and as another example, a user might manually enter in their credit card details (e.g., their credit card number) into a website field to conduct an online transaction, such that they need not physically have the credit card in-hand to complete the transaction. In such a circumstance, the transaction might be said to be a card-not-present transaction. Card-present transactions are often conducted at physical locations (e.g., at a store), meaning that it is particularly likely that one or more authorized users of an account will be present during that transaction.

In step 402, the computing device may receive location data from a user device, such as the user device 301. The location data might indicate one or more locations of the user device 301 over a period of time. For example, the computing device may receive, from a user device associated with the user account, location data indicating a plurality of locations of the user device at different times. In one example, the user device may send location data at regular intervals. Additionally and/or alternatively, the user device may send location data whenever the user device determines that the user location has moved (e.g., since the last time location data was sent). For example, the user device may determine that it has moved at least a threshold distance from the location indicated by the previous location data, then transmit location data based on that determination. Additionally and/or alternatively, an application and/or operating system of the user device (e.g., a wallet application) may be configured to send location data whenever it detects that a transaction occurred (e.g., using a digital credit card stored in the wallet application). The location data might comprise one or more of GPS coordinates at different times, indications of wireless access points nearby the user device at different times, or the like.

As part of receiving the location data, the computing device might request the location data from the user device. The user device might provide the location data to the user device based on permissions provided by a user. For example, a user might be prompted to provide the computing device access to the location data. In this manner, the user might control whether location data (which might be particularly personal) is received by the computing device.

The location data might be received based on determining that the user device to which the location data corresponds typically travels with (e.g., is carried by) an authorized user. While an authorized user might be presumed to carry their smartphone with them everywhere they go, that assumption might not be valid for larger computing devices, such as desktop computers. Thus, a user may designate a device that indicates their current location.

As part of receiving the location data, the location data might be correlated to a particular authorized user of a plurality of authorized users for an account. While an account might have a plurality of different authorized users, the user device 301 might be carried by only one of those authorized users. As such, a database (e.g., the user account database 304) might be queried to identify which authorized user, of the plurality of authorized users, corresponds to the user device 301. Based on this correlation, the location of the user device 301 might be associated with a location of the identified authorized user.

Step 403 through step 406 begin a loop which may be repeated for each of a plurality of transactions indicated by the transaction data received in step 401. Through this process, the computing device may tag at least a subset of the plurality of the transactions with an indication that a user was present for a respective transaction. Not every transaction indicated by the transaction data received in step 401 need be tagged: for example, only transactions where the location data suggests a user was present might be tagged as such. With that said, as will be detailed below, all transactions might be tagged based on a likelihood that a user was present. For example, a first transaction might be tagged with an indication that a user was almost certainly present, a second transaction might be tagged with an indication that the user was almost certainly not present, and a third transaction might be tagged with an indication that the user might have been present.

The computing device might tag transactions with an indication of a particular user or users that is estimated to have been physically present during a transaction. An account might have a plurality of different authorized users. For example, two spouses might be authorized users of a checking account. In such a circumstance, the financial transactions indicated by the transaction data received in step 401 might have been performed by a plurality of different users. As such, one or more of the plurality of transactions may have been made by an authorized user who is different from the user requesting access to the account. In this circumstance, the computing device may tag at least a subset of the plurality of the transactions with an indication that a particular user or users was present for a respective transaction. To make this determination, location data for a plurality of different user devices might be collected, then the location of those user devices might be used to determine which user(s) of a plurality of different users were present during a transaction. For example, based on location data for a plurality of different user devices for a plurality of different users, one transaction might be tagged "User 1 Present," another transaction might be tagged "User 2 Present," a third transaction might be tagged "User 1 and User 2 Present," and yet another transaction might be tagged "No User(s) Present."

In step 403, the computing device may determine the location of a merchant. The location of a merchant might be determined for a particular transaction of a plurality of transactions indicated by the transaction data received in step 401. For example, the computing device may determine a location of a merchant associated with a respective transaction. The location of the merchant might be determined by querying the merchants database 306 using one or more elements of the transaction data. For example, the merchant name and/or a unique identifier of a merchant might be used to query the merchants database 306 to determine one or more locations of the merchant.

In step 404, the computing device may determine if the user device was near the location of a merchant. To determine whether the user device was near the location of the merchant, the computing device may compare the location data (e.g., as received at step 402) to the location of the merchant at a time of the respective transaction. For example, if the transaction data indicates that a respective transaction was conducted at 9:00 PM, then the location data of the user device around 9:00 PM might be processed to determine whether the location data indicates that the user device was near the location of the merchant.

As part of determining whether the user device was near the location of the merchant, a distance between the location of the merchant and a location of the user device (e.g., around the time the transaction was conducted) might be measured and compared to a threshold (e.g., two hundred feet). If the distance satisfies the threshold (e.g., if the location of the user device was equal to or closer than two hundred feet from the merchant around the time of the transaction), the computing device might determine that the user device was near the location of the merchant. In contrast, if the distance does not satisfy the threshold (e.g., if the location of the user device was greater than two hundred feet from the merchant around the time of the transaction), the computing device might determine that the user device was not near the location of the merchant. Moreover, the threshold might indicate a variety of confidence levels. For example, if the user device is within 100 feet of a merchant location, then a transaction might be definitively tagged as "User Present." In contrast, if the user was within 500 feet of the merchant location (but not within 100 feet of the merchant location), the same transaction might be tagged as "User Possibly Present."

The location data need not precisely indicate the location of the user device at the time when the transaction was conducted. For example, the location data might indicate an approximate location of the user device minutes before and/or minutes after the transaction. As such, the computing device might determine that the user device was near the location of a merchant even if the location data does not indicate that the user device was at the merchant at the precise time the transaction was conducted. The threshold might be a fuzzy threshold, such that exact precision is not required.

Determining whether the user was near the location of the merchant at the time of the respective transaction may be based on the accuracy of the location data. The accuracy with which the user device 301 logs its own location might vary. For example, the user device 301 might be relatively less precise when measuring its location when in a low-power state, when underground, and/or if the user device 301 comprises older GPS circuitry. To account for this potential lack of accuracy, the computing device may determine an accuracy of the location data and take this into account when comparing the location data to the location of a merchant. For example, the computing device might determine, based on operating parameters of the user device 301 (e.g., its make and/or model, the type of GPS circuitry used, whether it operates in a low power state), a predicted accuracy of the location data. The threshold might be modified based on this accuracy. If the accuracy is relatively poor, then the threshold might be relaxed, such that the computing device may determine that the user device was near the location of a merchant even if, e.g., the location data suggests that the user device 301 was relatively far away from the location of the merchant. In contrast, if the accuracy is relatively high, then the threshold might be made stricter, such that the computing device may determine that the user device was near the location of a merchant only if, e.g., the location data suggests that the user device 301 was particularly close to the location of the merchant.

Determining whether the user was near the location of the merchant at the time of the respective transaction may be based on the density of merchants near the location of the merchant. Many merchants might be located in a relatively small geographic area, such as a shopping mall. Accordingly, the computing device may determine a density of merchants near the location of the merchant by, e.g., analyzing the location of various merchants stored by the merchants database 306. Based on that density, the threshold might be modified. For example, if multiple merchants are in a relatively small geographical area, then the threshold might be made stricter, such that the computing device may determine that the user device was near the location of a merchant only if, e.g., the location data suggests that the user device 301 was particularly close the location of the merchant. In contrast, if only a single merchant is in a relatively large geographical area, then the threshold might be relaxed, such that the computing device may determine that the user device was near the location of a merchant even if, e.g., the location data suggests that the user device 301 was relatively far away from the location of the merchant.

Determining whether the user was near the location of the merchant at a time of the respective transaction might comprise estimating a location of a user. Given that the location data might not be perfectly accurate and might not indicate the location of a user at all times, the location of the user might be estimated, and that estimated location might be compared to the location of the merchant. The computing device may determine that the location data does not indicate a location of the user device at the time of the respective transaction. The computing device might also determine that the location data indicates a location of the user device at a different time. For example, the transaction might have been conducted at 9:05 PM, but the location data might only have GPS coordinates corresponding to 9:00 PM and 9:10 PM. The computing device might then estimate, based on a difference between the time of the transaction and the different time and based on a distance between the location of the merchant and the location of the user device at the different time, whether the user was likely near the location of the merchant at the time of the respective transaction. Returning to the previous example, the location data for 9:00 PM and 9:10 PM might be analyzed, and estimated location(s) of the user might be compared to the location of the merchant. For example, the computing device might estimate that the user device was, at 9:05 PM, at a point between the point it was at 9:00 PM and 9:10 PM. As another example, the computing device might curve fit GPS coordinates to estimate intermediary points between the GPS coordinates. In this manner, the computing device may determine that the user device was near the location of a merchant based on comparing the estimated location of the user device to the location of the merchant.

Estimating a location of the user device 301 might comprise use of a machine learning model. A machine learning model (e.g., as implemented using the machine learning software 127 and/or the example neural network 200) might be trained based on training data comprising a history of user device locations in a geographic region. For example, the machine learning model might be provided a history of user device locations for a plurality of different user devices when moving in a particular geographic region. In this manner, the machine learning model might be trained to estimate movement of a user device based on, e.g., past and/or future locations of that user device (and/or other user devices). The computing device might provide, as input to the trained machine learning model, the location data received in step 402. The computing device might then receive, as output from the trained machine learning model, an indication of an estimated location of the user device at various times. This process might allow the computing device to, in effect, gap-fill uncertainties in the location data: for example, if the location data indicates GPS coordinates at 9:00 AM and 9:30 AM but not GPS coordinates at 9:15, the trained machine learning model might be trained to receive the location data as input and output one or more estimated locations of a user device at, e.g., 9:15 AM.

In step 405, the computing device may tag transactions in a manner which indicates whether one or more authorized users were likely present during the transaction. For example, based on comparing the location data to the location of the merchant at a time of the respective transaction, the computing device may tag the transaction with the indication that the user was present for the respective transaction. The indication might be represented as a Boolean value (e.g., "User Present," "User Not Present") for one or more authorized users (e.g., each authorized user might be associated with a separate Boolean value), a percentage value representing the likelihood that a user was present (e.g., a 60% likelihood that a user was present during the transaction), or the like.

A transaction might be tagged based on whether or not it indicates that a card was physically present. As discussed above, transactions might be conducted in a manner where a card was directly present. In turn, one or more of the plurality of transactions indicated by the transaction data received in step 401 may be associated with an indication that a payment card was present during the transaction. For example, the transaction data might comprise an indication that a card was manually inserted into a point of sale system. Such information might indicate that at least one authorized user was physically present during a transaction. In this manner, a transaction might be tagged not merely based on, e.g., comparing the location data to the location of the merchant at a time of the respective transaction, but also based on whether the transaction data indicates that the card was physically present.

In step 406, the computing device may determine whether there are additional transactions to tag. As indicated above, the method 400 might repeat step 403 through step 406 for one or more transactions indicated by the transaction data. Not all transactions indicated by the transaction data need be processed in this manner: for example, only a predetermined number (e.g., the five latest transactions) might be processed in this manner for efficiency. If there are additional transactions to tag, the method 400 returns to step 403. If there are no more transactions to tag, the method 400 proceeds to step 400.

In step 407, the computing device may generate one or more authentication questions. The authentication questions might be generated using data stored by the authentication questions database 305. The authentication questions might be based on the tagged transactions. For example, the computing device may generate, based on the subset of the plurality of transactions, a plurality of authentication questions. The authentication questions might be based on whether one or more authorized users were likely present during a particular transaction, which might be reflected by the tagging performed in step 405. For example, an authentication question might ask a user to confirm whether they were physically present for a transaction (e.g., "Did you conduct your last purchase online or in-person?"). As another example, an authentication question might ask a user to confirm whether they or another authorized user were physically present for a transaction (e.g., "Were you the person that purchased gas using your credit card yesterday?"). As yet another example, a plurality of different authentication questions might be generated, but all such authentication questions might be based on transactions where the user was physically present.

Generating the one or more authentication questions might comprise identifying which authorized user may be requesting access to the account. A user might request access to an account. As part of that request, an indication of the user might be received. For example, the request might comprise a username uniquely associated with a first authorized user of a plurality of authorized users for an account. Based on that indication of the user, transactions where the user was present might be selected. In this manner, in circumstances where an account might have multiple authorized users, the requesting user need not be asked questions about transactions where they were not present.

Generating the one or more authentication questions might comprise generating authentication questions involving transactions where a user was and was not present, which might be determined based on the tagging performed in step 405. For example, an authentication process might involve asking a user two questions: one question might relate to a transaction where the user was physically present (e.g., an in-person transaction in a store), whereas the other question might relate to a transaction where the user was not physically present (e.g., an online purchase). To perform this process, the computing device may identify, from the plurality of transactions indicated by the transaction data, a second subset of transactions where the user was not present. For example, such transactions might be tagged as such (e.g., "User Not Present"). The computing device might then generate a second plurality of authentication questions based on the second subset of transactions.

In step 408, the computing device may cause presentation of the one or more authentication questions generated in step 407. Causing presentation of the authentication question may comprise causing one or more computing devices to display and/or otherwise output the authentication question. The authentication question might be provided in a text format (e.g., in text on a website), in an audio format (e.g., over a telephone call), or the like.

In step 409, the computing device may receive one or more responses to the one or more authentication questions presented in step 408. A response may be any indication of a response, by a user, to the authentication question(s) presented in step 408. For example, if an authentication question comprises one or more answers from which the user should select, the response might comprise a selection of at least one of the one or more answers. As another example, in the case of a telephone call, the response might comprise an oral response to an authentication question provided using a text-to-speech system over the call.

In step 410, the computing device may determine whether to provide access to the account. Determining whether to provide access to the account might be based on whether the response(s) received in step 409 are correct. If the computing device decides to provide access to the account, the method 400 proceeds to step 411. If the computing device decide to not provide access to the account, the method 400 ends.

Determining whether to provide access to the account might be based on an authentication score. If the computing device generates and presents a plurality of authentication questions, an authentication score might be calculated based on the responses to each of the plurality of different authentication questions. For example, where the computing device generated a plurality of authentication questions (e.g., relating to transactions where the user was present) and a second plurality of authentication questions (e.g., relating to transactions where the user was not present), an authentication score might be calculated based on the responses to the plurality of authentication questions and based on responses to the second plurality of authentication questions. If the authentication score satisfies a threshold (e.g., at least 50% of the questions being correct), the computing device might determine to provide access to the account.

In step 411, the computing device may provide access to the account. Access to the account might be provided by, e.g., providing a user device access to a protected portion of a website, transmitting confidential data to a user device, allowing a user to request, modify, and/or receive personal data (e.g., from the user account database 304 and/or the transactions database 303), or the like. For example, the computing device may provide access to the account based on responses to the plurality of authentication questions.

Figure 5:
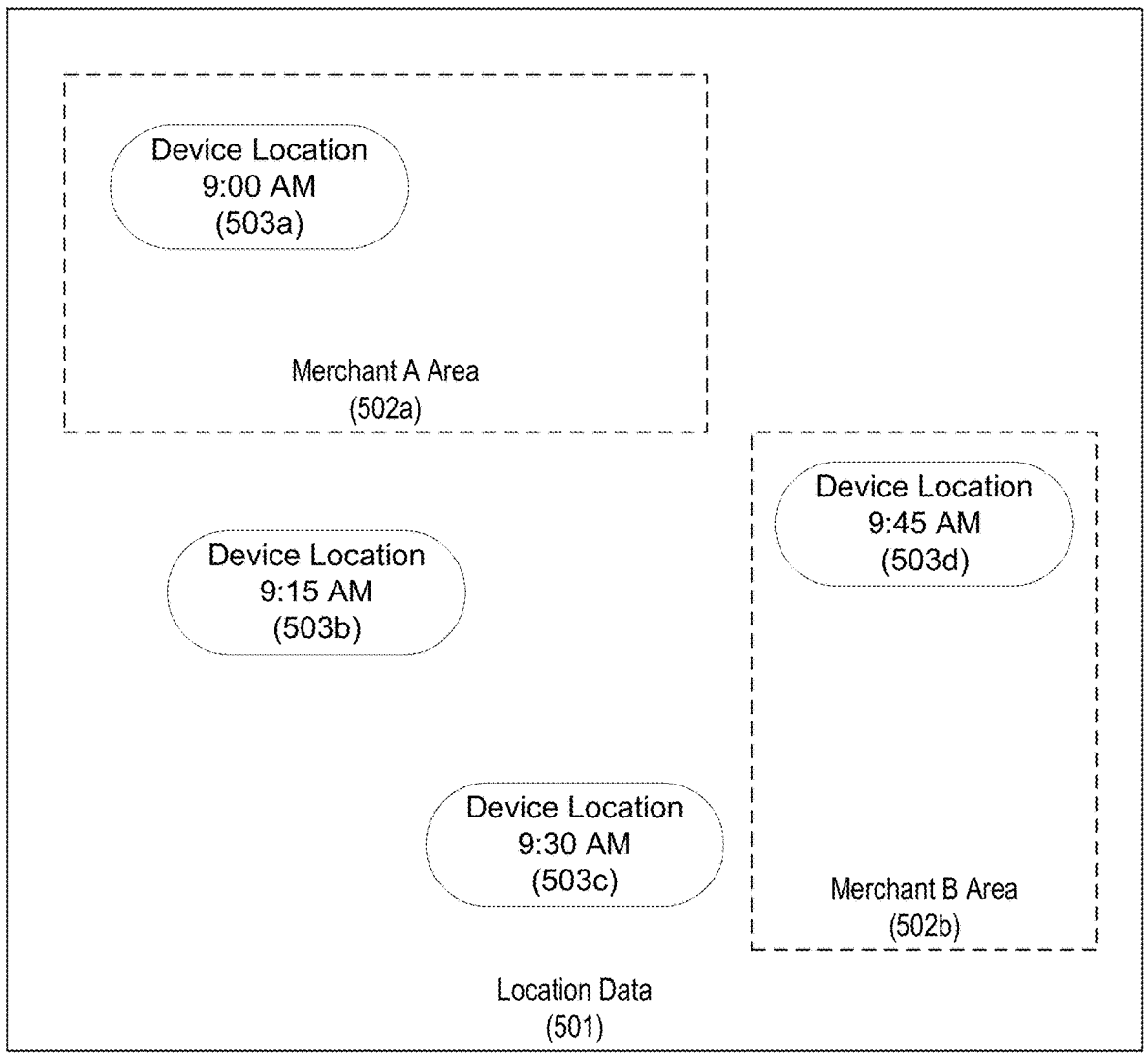
FIG. 5 depicts illustrative location data.

FIG. 5 depicts an example of location data which might be collected and stored by the user device 301. In particular, FIG. 5 shows location data 501, which might be the same location data as received in step 402 of the method 400 of FIG. 4. The location data 501 may comprise a plurality of indications of the location of the user device 301 over a period of time. For example, the location data 501 is shown as including a first device location 503a at 9:00 AM, a second device location 503b at 9:15 AM, a third device location 503c at 9:30 AM, and a fourth device location 503d at 9:45 AM. For the purposes of illustration, FIG. 5 also illustrates areas associated with merchants, such as an area 502a for Merchant A and an area 502b for Merchant B. By comparing the first device location 503a with the Merchant A area 502a, the computing device might determine that the user device 301 was inside of a store associated with Merchant A around 9:00 AM. By comparing the fourth device location 503d with the Merchant B area 502b, the computing device might determine that the user device 301 was inside of a store associated with Merchant B around 9:45 AM. With that said, the mere presence of the user device 301 in these areas need not suggest that a transaction was conducted. After all, a user might simply browse a store without buying anything.

As indicated above with respect to FIG. 4, the computing device might use the location data 501 to determine whether the user was present during certain transactions. For example, if transaction data indicates that an authorized user conducted a transaction at Merchant B at 9:45 AM, the computing device might determine that the user was physically present during that transaction because the fourth device location 503d indicates that the user device 301 was in the Merchant B area 502b at that time. In contrast, if the transaction data indicates that a user conducted a transaction at Merchant B at 9:15 AM, the computing device might determine that the user was not physically present during that transaction because the first device location 503a indicates that the user device 301 was not in the Merchant B area 502b at that time.

FIG. 6 comprises various examples of authentication questions which might be generated based on knowledge of whether a user was physically present for a transaction. All such authentication questions might be based on a transaction, in the transaction data, that has been tagged as being an in-person transaction. A first authentication question 601 asks a user "When did you conduct an in-person transaction at Merchant A?", with possible options "Around 9:00 AM" and "Around 9:30 AM." A second authentication question 602 asks a user "Did you purchase anything at Merchant B at 9:00 AM?", with possible answers "Yes" and "No." A third authentication question 603 asks a user "Did you purchase at Merchant A online or in person?", with possible answers "Online" or "In-Person." A fourth authentication question 604 asks a user "Who shopped at Merchant A this morning?", with possible answers "User A" and "User B." The fourth authentication question 604 in particular illustrates an example of a question that might be generated using a tagged transaction where an account is associated with multiple authorized users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a computing device, transaction data associated with a user account, wherein the transaction data indicates a plurality of transactions associated with the user account and conducted by a plurality of different users;
   receiving, by the computing device, from a user device associated with the user account, location data indicating a plurality of locations of the user device at different times;
   tagging, by the computing device, at least a subset of the plurality of the transactions with an indication that a user of the plurality of users was present for a respective transaction by:
      determining a location of a merchant associated with the respective transaction;
      determining that the location data does not indicate a location of the user device at a time of the respective transaction;
      identifying, in the location data, one or more locations of the user device at one or more different times;
      determining, based on a difference between the time of the transaction and the one or more different times, and based on a distance between the location of the merchant and the one or more locations of the user device at the one or more different times, an estimated location of the user device;
      determining, based on the estimated location of the user device and based on a density of merchants near the location of the merchant, whether the user device was near the location of the merchant at a time of the respective transaction; and if the user device was near the location of the merchant at the time of the respective transaction, tagging the transaction with the indication that the user of the plurality of users was present for the respective transaction;
generating, based on the subset of the plurality of transactions, a plurality of authentication questions; and
providing access to the user account based on responses to the plurality of authentication questions.

2. The method of claim 1, wherein the transaction data further includes an indication, for each of the plurality of transactions, of whether a payment card was present during the transaction, and wherein each of the subset of the plurality of transactions is associated with an indication that the payment card was present during the transaction.

3. The method of claim 1, further comprising:
determining an accuracy of the location data,
wherein the determining whether the user was near the location of the merchant at the time of the respective transaction is based on the accuracy of the location data.

4. The method of claim 1, further comprising:
determining the density of merchants near the location of the merchant based on quantity of merchants associated with the location of the merchant.

5. The method of claim 1, further comprising:
identifying, from the plurality of transactions, a second subset of transactions where the user was not present;
generating a second plurality of authentication questions based on the second subset of transactions; and
calculating, based on the responses to the plurality of authentication questions and based on responses to the second plurality of authentication questions, an authentication score.

6. The method of claim 1, wherein the determining the estimated location of the user device is based on applying a curve fit to the one or more locations of the user device at the one or more different times.

7. The method of claim 1, wherein the subset of the plurality of transactions comprises at least one transaction made by an authorized user who is different from the user.

8. A computing device comprising:
one or more processors; and
memory storing instructions that, when executed by the one or more processors, cause the computing device to:
receive transaction data associated with a user account, wherein the transaction data indicates a plurality of transactions associated with the user account and conducted by a plurality of different users;
receive, from a user device associated with the user account, location data indicating a plurality of locations of the user device at different times;
tag at least a subset of the plurality of the transactions with an indication that a user of the plurality of users was present for a respective transaction by:
determining a location of a merchant associated with the respective transaction;
determining that the location data does not indicate a location of the user device at a time of the respective transaction;
identifying, in the location data, one or more locations of the user device at one or more different times;
determining, based on a difference between the time of the transaction and the one or more different times, and based on a distance between the location of the merchant and the one or more locations of the user device at the one or more different times, an estimated location of the user device; and
comparing the estimated location of the user device to the location of the merchant; and
based on the comparing and based on a density of merchants near the location of the merchant, tagging the respective transaction with the indication that the user of the plurality of users was present for the respective transaction;
generate, based on the subset of the plurality of transactions, a plurality of authentication questions; and
provide access to the user account based on responses to the plurality of authentication questions.

9. The computing device of claim 8, wherein the transaction data further includes an indication, for each of the plurality of transactions, of whether a payment card was present during the transaction, and wherein each of the subset of the plurality of transactions is associated with an indication that the payment card was present during the transaction.

10. The computing device of claim 8, wherein the instructions, when executed by the one or more processors, further cause the computing device to:
determine an accuracy of the location data,
wherein the tagging the transaction is based on the accuracy of the location data.

11. The computing device of claim 8, wherein the instructions, when executed by the one or more processors, further cause the computing device to:
determine the density of merchants near the location of the merchant based on quantity of merchants associated with the location of the merchant.

12. The computing device of claim 8, wherein the instructions, when executed by the one or more processors, further cause the computing device to:
identify, from the plurality of transactions, a second subset of transactions where the user was not present;
generate a second plurality of authentication questions based on the second subset of transactions; and
calculate, based on the responses to the plurality of authentication questions and based on responses to the second plurality of authentication questions, an authentication score.

13. The computing device of claim 8, wherein the determining the estimated location of the user device is based on applying a curve fit to the one or more locations of the user device at the one or more different times.

14. The computing device of claim 8, wherein the subset of the plurality of transactions comprises at least one transaction made by an authorized user who is different from the user.

15. One or more non-transitory computer-readable media storing instructions that, when executed by one or more processors, cause a computing device to:
receive transaction data associated with a user account, wherein the transaction data indicates a plurality of transactions associated with the user account and conducted by a plurality of different users;
receive, from a user device associated with the user account, location data indicating a plurality of locations of the user device at different times;
tag at least a subset of the plurality of the transactions with an indication that a user of the plurality of users was present for a respective transaction by:
determining a location of a merchant associated with the respective transaction;

determining that the location data does not indicate a location of the user device at a time of the respective transaction;

identifying, in the location data, one or more locations of the user device at one or more different times;

determining, based on a difference between the time of the transaction and the one or more different times, and based on a distance between the location of the merchant and the one or more locations of the user device at the one or more different times, an estimated location of the user device; and comparing the estimated location of the user device to the location of the merchant; and based on the comparing and based on a density of merchants near the location of the merchant, tagging the respective transaction with the indication that the user of the plurality of users was present for the respective transaction;

generate, based on the subset of the plurality of transactions, a plurality of authentication questions; and provide access to the user account based on responses to the plurality of authentication questions.

16. The one or more non-transitory computer-readable media of claim 15, wherein the transaction data further includes an indication, for each of the plurality of transactions, of whether a payment card was present during the transaction, and wherein each of the subset of the plurality of transactions is associated with an indication that the payment card was present during the transaction.

17. The one or more non-transitory computer-readable media of claim 15, wherein the instructions, when executed by the one or more processors, further cause the computing device to:

determine an accuracy of the location data, wherein the tagging the transaction is based on the accuracy of the location data.

18. The one or more non-transitory computer-readable media of claim 15, wherein the instructions, when executed by the one or more processors, further cause the computing device to:

determine the density of merchants near the location of the merchant based on quantity of merchants associated with the location of the merchant.

19. The one or more non-transitory computer-readable media of claim 15, wherein the instructions, when executed by the one or more processors, further cause the computing device to:

identify, from the plurality of transactions, a second subset of transactions where the user was not present;

generate a second plurality of authentication questions based on the second subset of transactions; and calculate, based on the responses to the plurality of authentication questions and based on responses to the second plurality of authentication questions, an authentication score.

20. The one or more non-transitory computer-readable media of claim 15, wherein the determining the estimated location of the user device is based on applying a curve fit to the one or more locations of the user device at the one or more different times.

\* \* \* \* \*